United States Patent [19]
Kondo

[11] Patent Number: 5,501,000
[45] Date of Patent: Mar. 26, 1996

[54] SLIDER INSERTING APPARATUS FOR CONCEALED SLIDE FASTENER AND CONCEALED SLIDE FASTENER FINISHING MACHINE

[75] Inventor: Naoki Kondo, Toyama, Japan

[73] Assignee: YKK Corporation, Tokyo, Japan

[21] Appl. No.: 341,136

[22] Filed: Nov. 16, 1994

[30] Foreign Application Priority Data

Nov. 18, 1993 [JP] Japan .................................. 5-289398

[51] Int. Cl.⁶ .................................................. A41H 37/06
[52] U.S. Cl. .............................. 29/767; 29/33.2; 29/408; 29/768
[58] Field of Search ........................... 29/768, 767, 766, 29/33.2, 408, 409

[56] References Cited

U.S. PATENT DOCUMENTS

| | | | |
|---|---|---|---|
| 3,789,487 | 2/1974 | Kawakami | 29/768 |
| 3,973,312 | 8/1976 | Douri et al. | 29/768 |
| 4,293,994 | 10/1981 | Moertel | 29/768 |
| 4,580,326 | 4/1986 | Kawakami et al. | 29/408 |
| 4,771,522 | 9/1988 | Osaki | 29/766 |
| 5,142,772 | 9/1992 | Ishikawa | 29/768 |
| 5,241,742 | 9/1993 | Sawada | 29/768 |

FOREIGN PATENT DOCUMENTS

| | | |
|---|---|---|
| 0141379 | 5/1985 | European Pat. Off. . |
| 0147771 | 7/1985 | European Pat. Off. . |
| 0180779 | 5/1986 | European Pat. Off. . |
| 0417773 | 3/1991 | European Pat. Off. . |

Primary Examiner—P. W. Echols
Attorney, Agent, or Firm—Hill, Steadman & Simpson

[57] ABSTRACT

A slider inserting apparatus is constructed such that before a concealed fastener chain is threaded through a slider, the front and back and the rear end of a flange portion and the left and right front surfaces and the left and right side surfaces and the fore-end of a guide post are held between a pair of upper and lower slider holders with a locking pawl held in a releasing position. With the insertion of the fastener chain, the back and rear end of the flange portion is freed from engagement with the lower holder to enable passage of the fastener chain through the slider. The slider is still held from different directions by the holders so that in despite of a unique or odd shape of the slider, the fastener chain can smoothly be threaded through the slider. The slider inserting apparatus is preferably combined with a chain-reversing apparatus having element-reversing grooves, in which instance the top stop applying process and the slider inserting process can be carried out continuously on one and the same processing machine.

5 Claims, 7 Drawing Sheets

SLIDER INSERTING APPARATUS FOR CONCEALED SLIDE FASTENER AND CONCEALED SLIDE FASTENER FINISHING MACHINE

BACKGROUND OF THE INVENTION

1. Field of the Invention

The present invention relates to an apparatus for inserting sliders successively onto a concealed slide fastener chain fed continuously, and also to a concealed slide-fastener finishing machine for applying top end stops to the fastener chain simultaneously with the insertion of the slider by the slider inserting-apparatus.

2. Description of the Prior Art

Although the slider inserting apparatus used exclusively for sliders for concealed slide fasteners are known, they are less in number than those used for sliders for general slide fasteners due to their structural complexity induced by the unique shape and configuration of the slider and fastener chain such as shown here in FIGS. 7 and 8. Particularly, as regards automatic slider inserting apparatuses of the so-called "forward insertion" type in which a concealed fastener chain is threaded in an engaged or coupled condition into the mouth of a slider and withdrawn from the opposite wider mouth of the slider in a disengaged or separated condition, it is rare to see a prior proposal other than one disclosed in Japanese Patent Publication No. 3-40090.

The slider inserting apparatus disclosed in this Japanese publication includes a pull guide having a pull groove for receiving therein a pull of the slider. The pull guide is movable from a lower side of a fastener chain to an upper side through the gap between two fastener tapes at an element-free space portion, so as to receive the pull of the slider which has already been held by a pair of slider holders on the upper side of the fastener chain, with the pull suspended vertically downwardly. The pull guide and the slider holders are attached to a common frame so that when the pull guide is lowered, the slider holders concurrently move downwards, thus enabling the pull to move through the fastener chain from the other side to the one side without interference with the fastener tapes.

After passing through the slider inserting apparatus, the fastener chain moves into a top stop applying station in which the folded inner longitudinal edge portions of the fastener tapes each carrying thereon a row of coupling elements are unfolded by reversing them with a spreading plate, and while keeping this unfolded condition of the tape edges, top end stops are attached to the respective fastener tape by fusing each part of the coupling elements located adjacent to one end of the element-free portion, in such a manner as disclosed in Japanese Patent Publication No. 59-33364. The fastener chain is then cut into individual product lengths to produce finished concealed slide fasteners in succession.

The slider inserting apparatus disclosed in Japanese Patent Publication No. 64-40090 has many movable parts or members vertically reciprocated by cylinder actuators, such as a rod member vertically reciprocated by a cylinder actuator for releasing a locking pawl of the slider from the coupling elements, or a group of members driven by cylinder actuators to vertically reciprocate in a complicated timed manner to hold the slider. With this arrangement, the disclosed slider inserting apparatus is rendered complicated in construction and requires a laborious and time-consuming design work to construct a control program for controlling operation of the individual cylinder actuators.

As may be understood from what the aforesaid two Japanese publications disclose, the conventional slider inserting apparatus and the top stop applying apparatus are disposed apart from one another, and even when the slider inserting operation and the top stop applying operation are achieved continuously, two independently operable apparatus are employed. In the case of the concealed slide fasteners, the top stop application can only be achieved after the rows of coupling elements are reversed or overturned about the respective longitudinal tape edges by passing the fastener chain through a chain reversing apparatus used exclusively for the so-called "chain reversing" operation, as shown in Japanese Patent Publication No. 59-33364. Thus, regarding the top stop application, the fastener chain for the concealed slide fastener requires one additional processing step as compared with the general fastener chain. Furthermore, in the case of the continuous fastener chain, various processing operations require high positioning accuracy and must be performed effectively at element-free portions, so it has been almost impossible heretofore to achieve the slider inserting operation and the top stop applying operation on a single finishing machine.

SUMMARY OF THE INVENTION

With the foregoing drawbacks of the prior art in view, it is an object of the present invention to provide an apparatus for inserting a slider for a concealed slide fastener, which is simple in construction and capable of reducing the number of actuating mechanisms, and a fastener finishing apparatus for concealed slide fasteners, which is integrally connected with the slider inserting apparatus into a single machine and capable of continuously applying top stops to a fastener chain.

According to the present invention, an apparatus for inserting a slider for a concealed slide fastener includes an upper slider holder having a contact surface contacting the back and the rear end of a flange portion of the slider, and a lower slider holder disposed directly below the upper slider holder and having a contact surface closely contacting, at least, the front surface and the fore-end of a guide post of the slider to support thereon the guide post, the lower slider holder being vertically movable when the slider is inserted onto a fastener chain. The lower slider holder includes a first holder portion and a second holder portion respectively disposed forwardly and rearwardly of a pull chamber which is defined between the first and second holder portions for receiving therein a pull of the slider. The first holder portion has a contact surface contacting the front surface and the fore-end of the guide post for supporting the guide post, and an unlocking surface contacting a locking pawl of the slider to release the locking pawl from interlocking engagement with coupling elements of the fastener chain when the contact surface of the first holder portion contacts with the front surface and the fore-end of the guide post. The second holder portion has a contact surface contacting the front surface of the flange portion for supporting the flange portion, the second holder portion being movable in a direction away from the slider when the slider is held between the upper and lower slider holders.

The slider inserting apparatus may preferably be used in combination with a fastener finishing machine for a concealed slide fastener, in which instance the fastener finishing machine preferably includes a chain cutting device disposed on the upstream side of the slider inserting apparatus for cutting the fastener chain into predetermined product lengths, a chain reversing apparatus disposed adjacent to the slider inserting apparatus on the downstream side thereof and composed of a chain-reversing upper guide including a pair of laterally spaced element-reversing grooves and a chain-reversing lower guide having a pair of element-reversing grooves, a top stop applying apparatus disposed on the downstream side of the chain reversing apparatus, and a fastener product discharge means for positioning a pair of fastener stringers of the fastener chain relative to the top stop applying device and discharging a fastener product with top stops attached thereto to the downstream side of the fastener finishing machine. Thus, a concealed slide fastener as a final product can be successfully produced.

Preferably, the first holder portion is pivotally movable about its lower end, and after the second holder portion contacts with the front surface of the flange portion of the slider, the first holder portion is pivotally moved upwardly to contact the front surface and the fore-end of the guide post and simultaneously unlock the locking pawl of the slider. In a preferred form of the invention, the second holder portion is independently movable downwardly away from the slider while the slider is held between the upper and lower slider holders. The fastener product discharge means preferably includes a pair of first grippers for gripping the pair of fastener stringers, respectively, at a cut end of the fastener chain from a first direction normal to a path of feed of the fastener chain, and a pair of second grippers for gripping the fastener stringers, respectively, at the cut end of the fastener chain from a second direction parallel to the feed path of the fastener chain when the first grippers release the leading end of the fastener chain, the first and second grippers being reciprocally movable in the first and second directions, respectively.

Before a slider is supplied to the lower slider holder, the first holder portion is disposed in a horizontal position. Then the slider is supplied to the lower slide holder, in which instance the slider is held on the second holder portion with a flange portion supported on a contact surface of the second holder portion. Substantially at the same time as the engagement between the slider flange portion and the second holder portion, the first holder portion and the chain-reversing lower guide are turned upwardly into respective upright positions. With this angular movement of the first holder portion, the contact surface is brought into abutment with the front surface and the fore-end of the guide post of the slider to support thereon the guide post. Simultaneously with this abutting engagement, the unlocking portion pulls down the locking pawl of the slider to release the locking pawl from interlocking engagement with the coupling elements, thereby allowing the fastener chain to move through a guide channel defined in the slider.

Then, the lower slider holder and the chain-reversing lower guide are moved upwardly until their arrival at the same plane with that of the feed path of the fastener chain. At the same time, the upper slider holder and the chain-reversing upper guide are lowered, so that the slide fastener chain while being advanced is lightly gripped by and between the upper and lower slider holders and also between the chain-reversing upper and lower guides. In this instance, the slider is disposed centrally between the left and right stringers gripped by a pair of gripping means, with the locking pawl raised into a releasing position, and with a pull received in a vertically suspended condition within the pull chamber defined between the first and second holder portions. The leading ends of the respective stringers are guided between the confronting stringer guide surfaces of the chain-reversing upper and lower guides. Then, the second holder portion is lowered to expose or free the downwardly facing front surface of the flange portion of the slider, thereby enabling the tapes to move through the guide channel in the slider. Before the fastener chain is threaded into the guide channel of the slider, the coupling element rows are guided in an element guide portion formed in the rear end supporting portion of the upper slider holder. The coupling element rows, as they are moved through a stepped supporting surface formed at the outlet of the element guide portion, are smoothly and reliably threaded into tile guide channel of the slider. In this instance, the slider is kept immovable partly because the downwardly facing front surface and the fore-end of the guide post are firmly retained on the first holder portion, with the locking pawl held in the releasing position, and partly because the back of the flange portion is stably supported by the upper slider holder.

As the fastener chain is moved through the slider, the two rows of coupling elements are disengaged by the slider. The rows of coupling elements are then introduced into the chain-reversing apparatus. The coupling element rows, as they move through the chain-reversing apparatus, are guided by and along element-reversing grooves formed in the chain-reversing upper and lower guides. During that time, at the inlet, the leg-side end of each of the coupling elements is brought into guided engagement with the inner peripheral wall of the element-reversing grooves. As each of the coupling element row is advanced toward the outlet side, it is turned gradually, and when it reaches the outlet side, the folded longitudinal tape edge is completely reversed or turned inside out together with the coupling elements supported thereon.

Then, while the inner tape edges are held in an unfolded flat condition, the fastener chain is fed into the top stop applying apparatus, in which top stops are attached to the respective tapes in a manner generally known per se. Simultaneously with this top stop applying operation, the cutting apparatus operates to cut the fastener chain at a predetermined position transversely across one element-free space portion. As a consequence of this cutting, a finished concealed slide fastener is produced and discharged from the fastener finishing machine. The foregoing procedures may be repeated to successively produce a desired number of concealed slide fasteners.

The above and other objects, features and advantages of the present invention will become manifest to those versed in the art upon making reference to the following detailed description and the accompanying sheets of drawings in which a preferred structural embodiment incorporating the principles of the present invention is shown by way of illustrative example.

DETAILED DESCRIPTION

The present invention will be described below in greater detail with reference to a preferred embodiment illustrated in the accompanying drawings. As previously stated, the invention provides in one aspect an apparatus for inserting a slider for a concealed slide fastener and, in another aspect, a fastener finishing machine for finishing tile concealed slide fastener. Since the slider inserting apparatus is incorporated in the fastener finishing machine, it appears that the description of the fastener finishing machine necessarily involves the description of the slider inserting machine. Accordingly, the following description will be directed to the fastener finishing machine.

Figure 1:
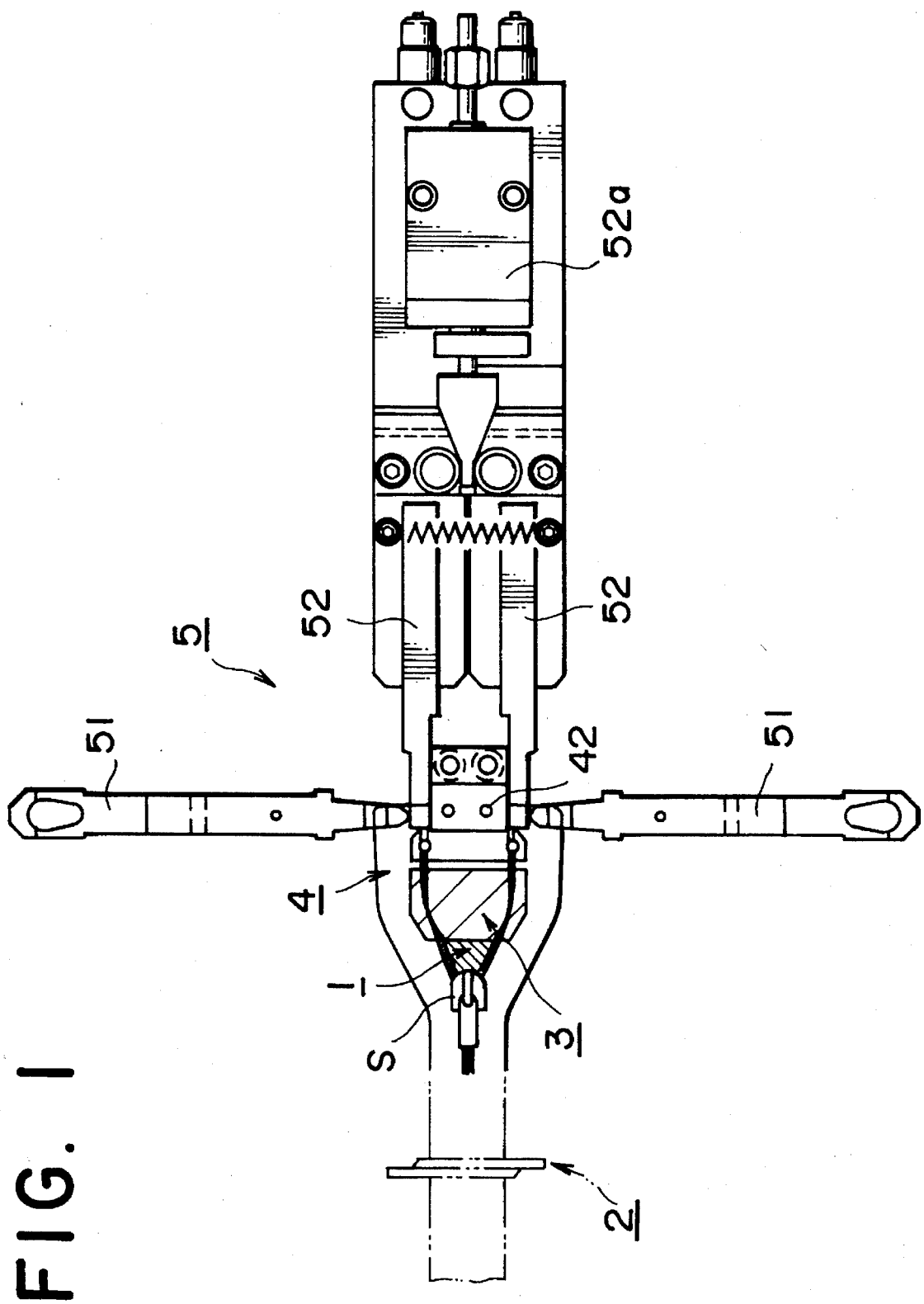
FIG. 1 is a schematic plan view showing the general construction of a concealed slide-fastener finishing machine embodying the present invention, with retailed illustration of a fastener discharging device.
Figure 2:
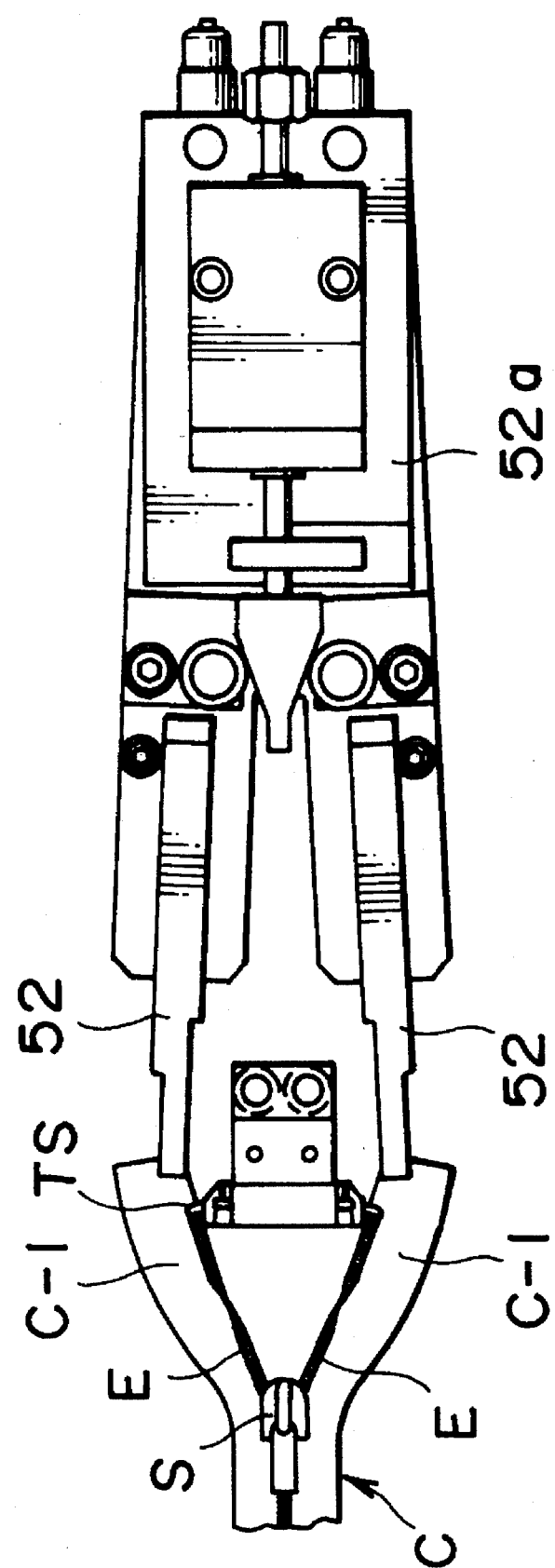
FIG. 2 is a view similar to FIG. 1, showing the operation of the slider discharging device.

As shown in FIGS. 1 and 2, a fastener finishing machine embodying the present invention for finishing a concealed slide fastener includes a slider inserting apparatus 1 for the concealed slide fastener, a chain cutting device 2 disposed on the upstream side of the slider inserting apparatus 1 for cutting the fastener chain C into predetermined product lengths, a chain reversing apparatus 3 disposed adjacent to the slider inserting apparatus 1 on the downstream thereof and composed of a chain-reversing upper guide (described later) including a pair of element-reversing grooves and a chain-reversing lower guide (described later) having a pair of element-reversing grooves, a top stop applying apparatus 4 disposed on the downstream side of said chain reversing apparatus 3, and a fastener product discharge means 5 for discharging a fastener product with-top stops attached thereto, to the down-stream side of the fastener finishing machine. The chain cutting device 2 does not have any arrangement designed particularly for the present invention. Rather, it is constructed such-that each time the continuous fastener chain C is advanced intermittently by a predetermined length measured by a length-measuring roller (not shown), a predetermined positioning operation is carried out with respect to an element-free space portion of the fastener chain C, and upon completion of this positioning, a cutter of a conventional construction operates to cut or sever the fastener chain C transversely.

Figure 3:
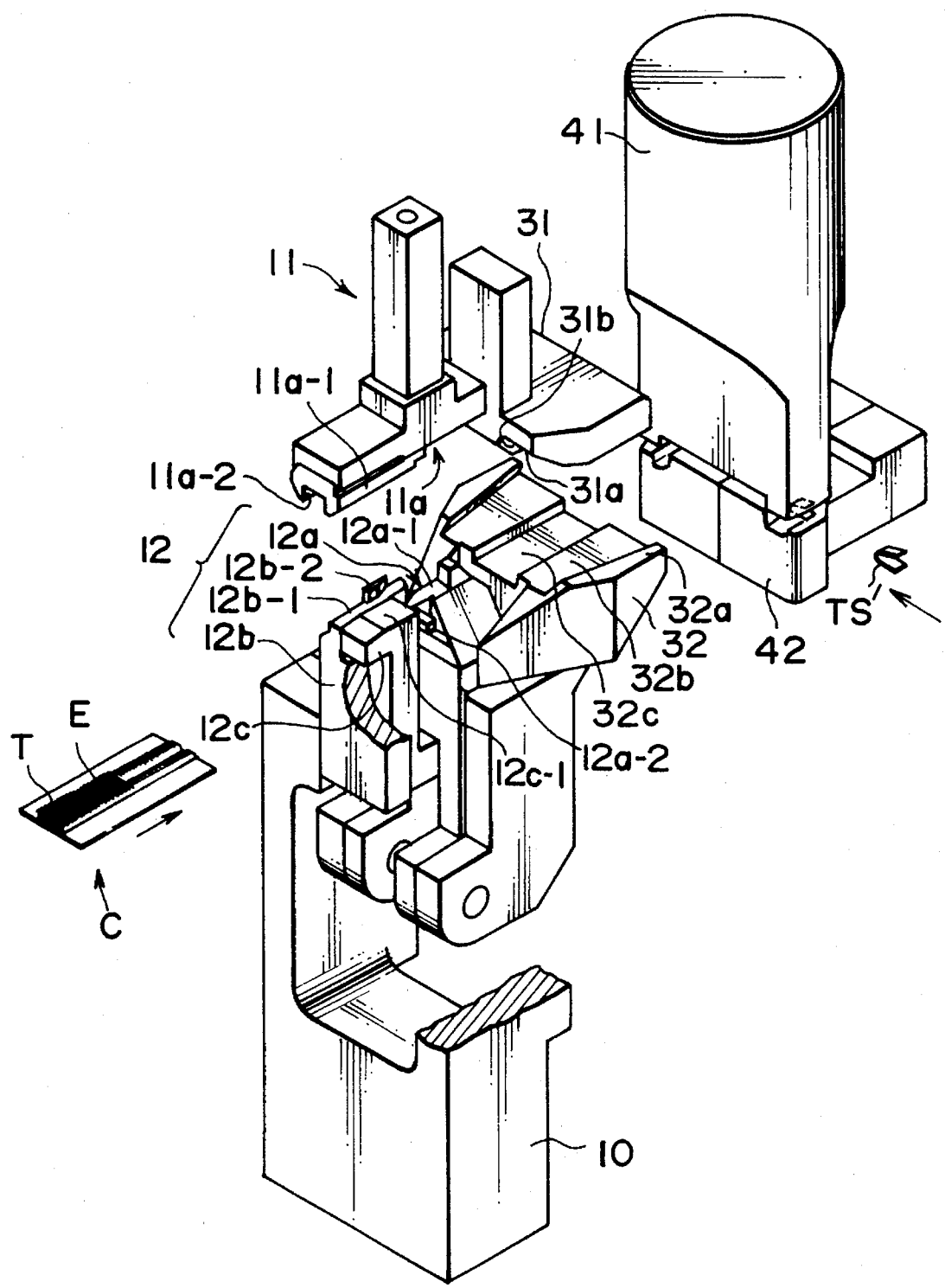
FIG. 3 is a perspective view, with parts cutaway for clarity, showing main portions of a slider inserting apparatus, a chain reversing apparatus, and a top stop applying apparatus, respectively, of the concealed slide-fastener finishing machine.

FIG. 3 illustrates in perspective a typical example of an arrangement of the slider inserting apparatus 1, the chain reversing apparatus 3 and the top stop applying apparatus 4. In this arrangement, movable parts or members are driven by drive system composed solely of cylinder actuators. As is generally known, the drive system, i.e., the cylinder actuators are operable by on command signals or instructions supplied from a control unit (not shown) in accordance with a predetermined processing procedure, and the illustration of the drive system is, therefore, omitted.

As clearly understood from FIG. 3, the slider inserting apparatus 1 is integrally provided with the chain reversing apparatus 3. It may of course be possible to connect the top stop applying apparatus 4 and the chain reversing apparatus 3 on a path of feed of the fastener chain C via a frame.

Figure 4:
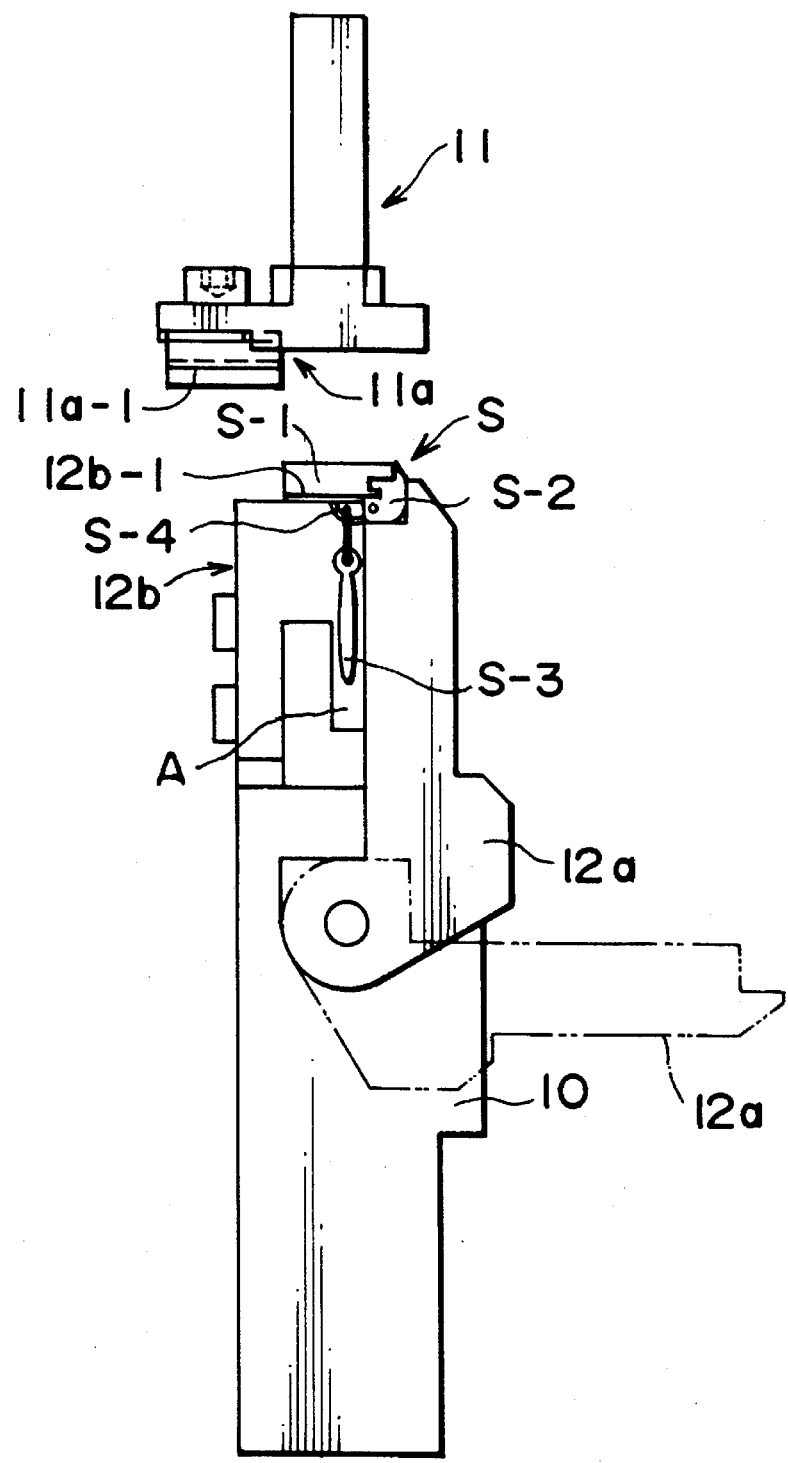
FIG. 4 is a diagrammatical view illustrative of the operation of the slider inserting apparatus.
Figure 5:
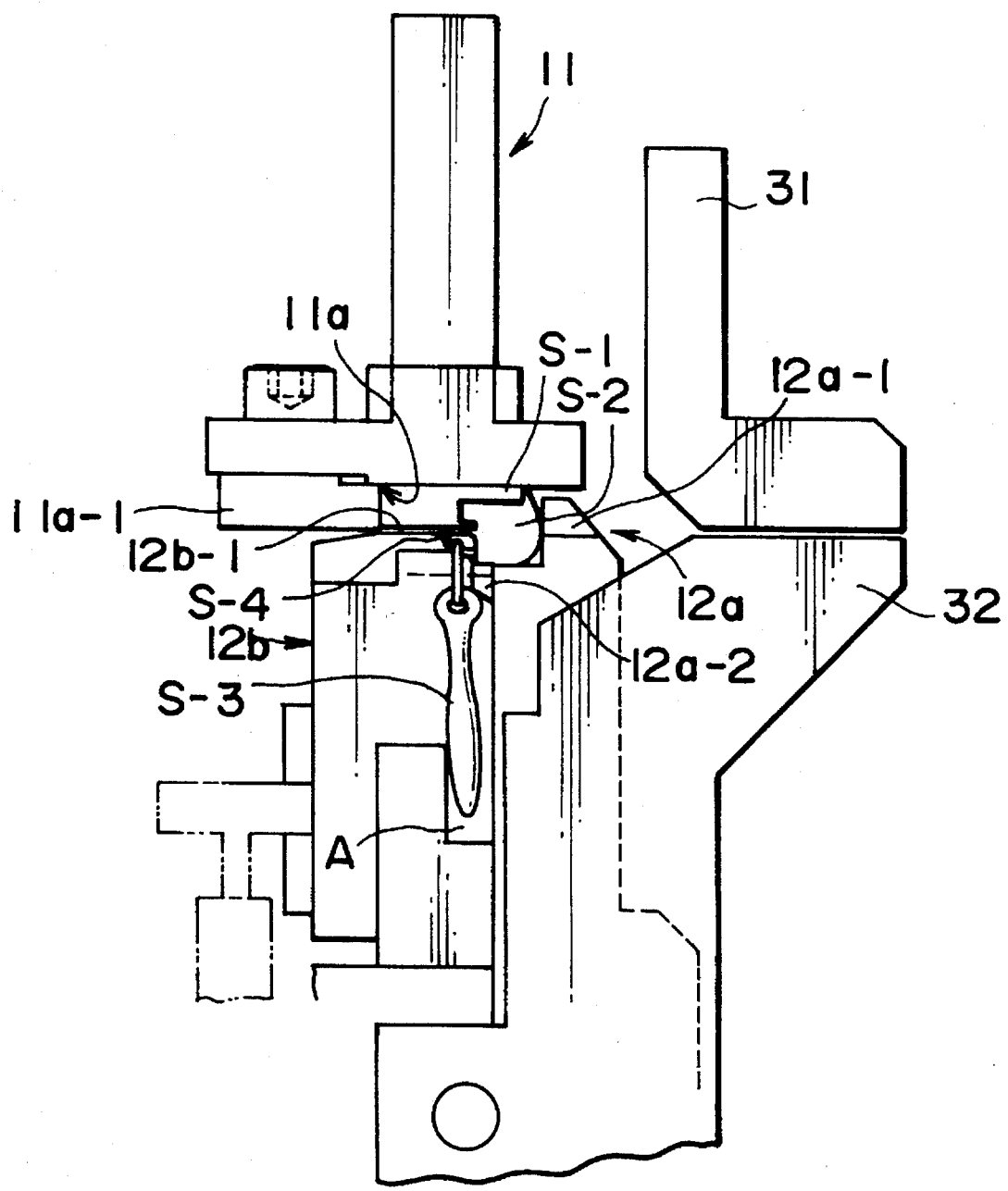
FIG. 5 is a side view of a main portion of the slider inserting apparatus and the chain reversing apparatus, showing a slider holding condition and a chain inserting position.

FIG. 4 diagrammatically illustrates the structure and operation of the slider inserting apparatus at an initial stage of the slider inserting operation, and FIG. 5 diagrammatically shows a condition in which the fastener chain C passes through the slider inserting apparatus 1 and the chain reversing apparatus 3. Now a description will be given of the slider inserting apparatus 1 and the chain revising device 3 with reference to FIGS. 1–5.

Designated by 10 is a support block having a substantially U shape and supporting thereon a lower part of the slider inserting apparatus 1 and a lower part of the chain reversing apparatus 4. The support block 10 is vertically movable by the operation of a non-illustrated cylinder actuator. The slider inserting apparatus 1 includes a pair of upper and lower slider holders 11 and 12 disposed in vertical alignment across the feed path of the fastener chains C.

The upper slider holder 11 is vertically and reciprocally movable, by the operation of a non-illustrated cylinder actuator, between the plane of the feed path of the fastener chain C and its standby position upwardly spaced from the plane. The upper slider holder 11 has in its underside a stepped support surface 11a which is engageable with the back and the rear end of a flange portion S-1 of the slider S for supporting the flange portion S-1, and a rear end supporting portion 11a-1 having an element guide groove 11a-2 for guiding a pair of rows of coupling elements of the fastener chain C along the feed path of the fastener chain C.

The lower slider holder 12 is supported by the support block 10 and includes a first holder portion 12a and a second holder portion 12b which are disposed respectively on the forward and rearward sides (i.e., the downstream and upstream sides) of a pull space or chamber A which is defined between the first and second holder portions 12a, 12b for receiving therein a pull S-3 of the slider S. The first holder portion 12a is pivotally connected at its lower end to the support block 10 and has a contact surface 12a-1 contacting with the front surface and the fore-end of a guide post S-2 of the slider S, and an unlocking portion (unlocking surface) 12a-2 contacting with a locking pawl S-4 to release the latter from interlocking engagement with the coupling elements when the contact surface 12a-1 and the front surface and the fore-end of the slider guide post S-4 contact with each other. The second holder portion 12b has a pair of laterally spaced, left and right first contact surfaces 12b-1 contacting with the left and right front surfaces of the flange port, on S-1, respectively, to support the flange portion S-1 from the bottom, and a pair of laterally spaced, left and right second contact surfaces 12b-2 contacting with the left and right side surfaces of the flange portion S-1 for supporting the flange portion S-1 from the opposite sides. The second holder portion 12b is supported by the support block 10 and vertically movable in the support block 10. When the slider S is held by the upper and lower slider holders 11, 12 and threaded over the fastener chain C, the second holder portion 12b is lowered by the operation of a non-illustrated cylinder actuator and hence is disengaged from the slider S. In the illustrated embodiment, a chain guide member 12c having a support surface 12c-1 disposed centrally between the left and right first contact surfaces 12b-1 for supporting thereon the concealed fastener chain C from-the bottom (front side) is fixedly supported by the support block 10.

The chain-reversing lower guide 32 of the chain reversing apparatus 3 is pivotally connected at its lower end to the support block 10 together with the lower slider holder 12. To this end, in the case of the illustrated embodiment, the chain-reversing upper guide 31 disposed above the feed path of the fastener chain C is connected to the upper slider holder 11 via a support member not shown.

The chain-reversing upper and lower guides 31, 32 have such structures as best shown in FIGS. 3 and 6(A)–6(E). More specifically, the chain-reversing upper and lower guides 31, 32 have confronting surfaces which are so profiled as to provide a pair of confronting stringer guide surfaces 31a, 32a cooperative with each other to guide the left and right fastener stringers C-1. The stringer guide surfaces 31a, 32a respectively have formed therein a pair of laterally spaced element-reversing grooves 31b; 32b coactive with the rows of coupling elements E to reverse or unfold the folded inner longitudinal edge portions C-2 of the fastner stringers C-1. The element-reversing grooves 31b, 32b are symmetrical with each other about its longitudinal center line of the corresponding stringer guide surface 31a, 32a. The lower stringer guide surface 32a is a guide passage having a width increasing progressively toward the direction of movement of the fastener chain C. Likewise, the upper stringer guide surface 32b is formed with a guide passage having a width increasing progressively toward the direction of movement of the fastener chain C, in conformity with a configuration of the lower element-reversing grooves 32b.

Figure 6A:
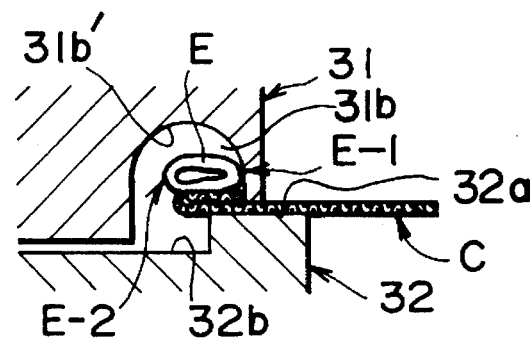
FIGS. 6(A) through 6(E) are schematic cross-sectional views illustrative of the chain reversing operation achieved by the chain reversing apparatus.
Figure 6B:
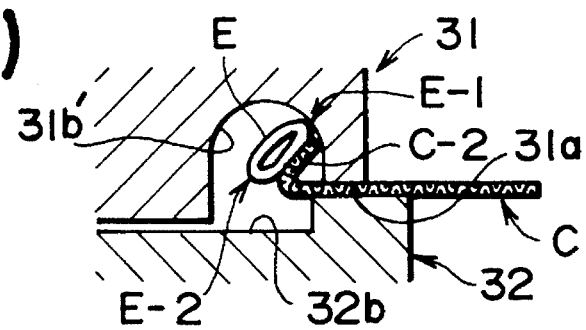
Figure 6C:
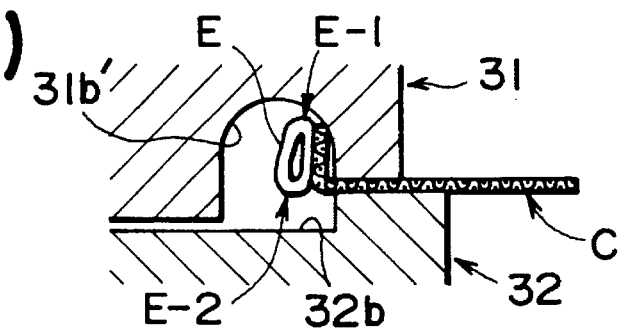
Figure 6D:
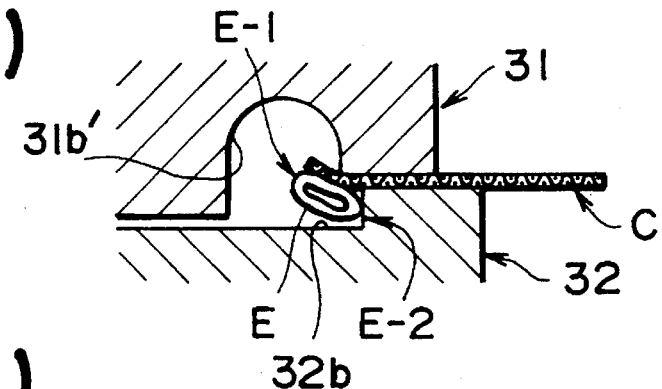
Figure 6E:
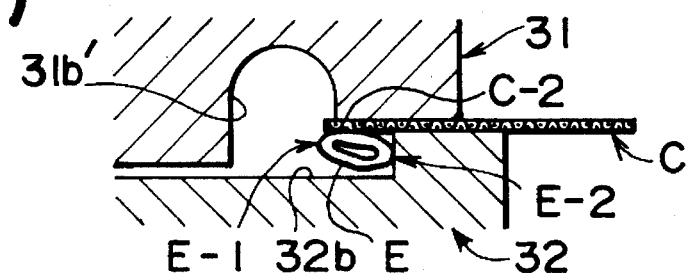
Figure 7:
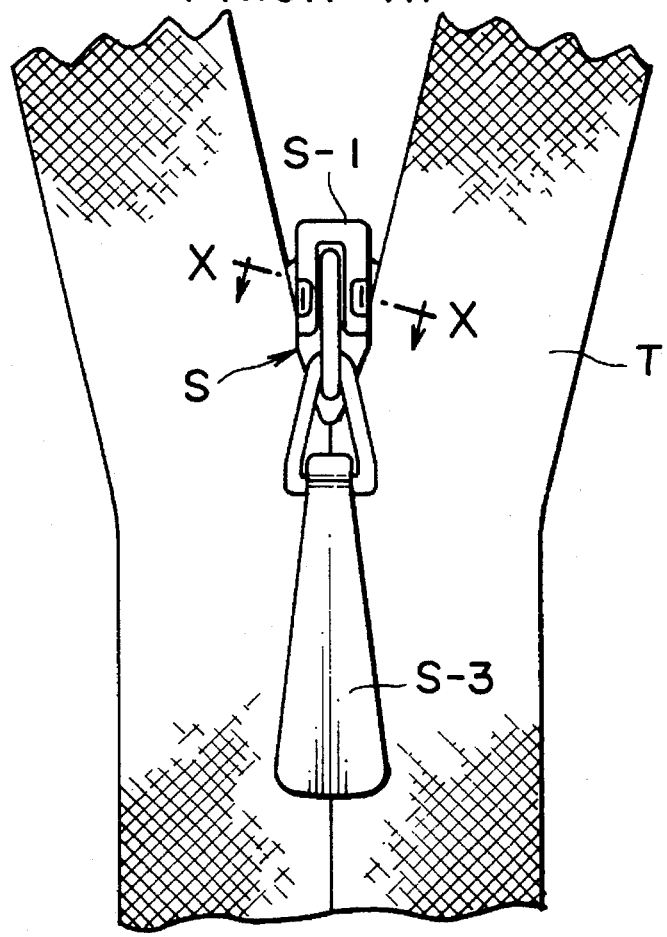
FIG. 7 is a plan view of a conventional slider as it is threaded over a concealed slide fastener chain.
Figure 8:
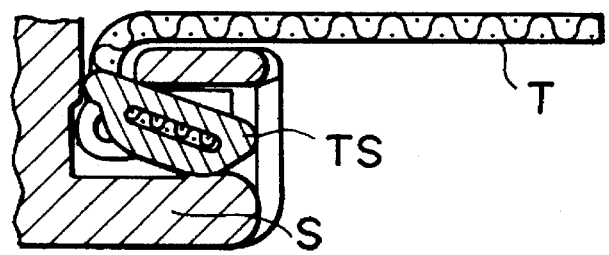
FIG. 8 is a partial cross-sectional view taken along line X—X in FIG. 7.

Each of the left and right element-reversing grooves 31b (only one being shown) formed in the chain-reversing upper guide 31 has an upwardly curving arcuate inner peripheral wall 31b', as shown in FIGS. 6(A)–6(E). The element-reversing grooves 31b extend convergently toward each other in a direction from the inlet side toward the outlet side of the grooves 31b (i.e., in the direction of feed of the fastener chain C). Accordingly, at the inlet side, the arcuate inner peripheral wall 31b' of each element-reversing groove 31b comes into contact with the leg-side end E-1 of each individual coupling element E, as shown in FIG. 6(A). As the fastener chain C advances progressively toward the outlet side, the coupling element row E is gradually raised or tilted upwardly and inwardly and then tilted downwardly and inwardly, as shown in FIGS. 6(B)– 6(D). And at the outlet side of the element-reversing groove 31b, the folded longitudinal tape edge C-2 is completely reversed or turned inside out together with the coupling elements supported thereon, as shown in FIG. 6(E). The element-reversing grooves 32b of the chain-reversing lower guide 32, which are disposed below the pair of upper element-reversing grooves 31b, are separated by a central groove 32c, as shown in FIG. 3. The width of the element-reversing grooves 32b is determined such that the fastener tapes T of the fastener chain C can advance through the chain reversing apparatus 3 while they are continuously gripped with an appropriate force between the lower stringer guide surface 32a and the upper stringer guide surface 31a, and when tile coupling element row E is reversed, each of the reversed elements E is brought into contact with a side wall of the element-reversing groove 32b at the coupling head-side end E-2.

The slider inserting apparatus 1 and the chain reversing apparatus 3 of the foregoing construction operate as follows.

After the fastener chain C is cut or severed by the chain cutting apparatus 4, the fastener tapes T are gripped by a pair of left and right first grippers 51 (FIG. 1), described later, at a leading end of the fastener chain C and pulled forwardly by the first grippers 51. When the gripped leading end of the fastener chain C arrives at a predetermined position on an installation side of the slider inserting apparatus 1 and the chain reversing apparatus 3, the first grippers 51 are temporarily stopped. In this instance, the first and second holder portions 12a, 12b of the slider inserting apparatus 1 support on their upper surfaces a slider which is supplied from a slider supplying apparatus, which is not shown. The slider supplying apparatus may be one shown in Japanese Patent Publication No. 63-40090.

Now description will be given of a manner in which the slider supplied from the non-illustrated slider supplying apparatus is placed on and held by the upper surfaces of the first and second holder portions 12a, 12b. Before being supplied with the sliders, the first holder portion 12a is disposed in a horizontal position indicated by two-dot chain lines shown in FIG. 4. The slider S is supported on the second holder portion 12b with the flange portion S-1 supported on the left and right first contact surfaces 12b-1 and the left and right second contact surfaces 12b-2. Substantially at the same time as the completion of contact between the slider S and the second holder portion 12b, a non-illustrated cylinder actuator operates to turn the first holder portion 12a upwardly into an upright position indicated by the solid line in FIG. 4. During this angular movement of the first holder portion 12a, the contact surface 12a-1 comes into abutment with the front surface and the fore-end of the guide post S-2 of the slider S to thereby support thereon the guide post S-2. Simultaneously with this abutting engagement, the unlocking portion 12a-2 pulls down the locking pawl S-4 of the slider S to release the locking pawl S-4 from interlocking engagement with the coupling elements E, thereby allowing the fastener chain C to move through a guide channel defined in the slider S. In the illustrated embodiment, in unison with the upward rotation of the first holder portion 12a, the chain-reversing lower guide 32 turns upwardly into an upright position so that the stringer guide surface 32a can lie in a horizontal plane.

Then, the lower slider holder 12 is moves upwardly by the operation of the non-illustrated cylinder actuator until it reaches to the plane of the feed path of the fastener chain C. At the same time, the upper slider holder 11 and the chain-reversing upper guide 31 are lowered by the operation of the non-illustrated cylinder actuator, so that the left and right fastener stringers C-1, C-1 while being gripped by the first grippers 51 are lightly gripped by and between the upper and lower slider holders 11, 12, and also between the chain-reversing upper and lower guides 31, 32. In this instance, the slider S is disposed centrally between the left and right stringers C-1 gripped by the corresponding first grippers 51 while it is held between the upper and lower slider holders 11, 12, as shown in FIG. 5, with the locking pawl S-4 raised into a releasing position, and with a pull S-3 received in a vertically suspended condition within the pull chamber A defined between the first and second holder portions 12a and 12b. The leading ends of the respective stringers S-1 are guided between the confronting stringer guide surfaces 31a, 32a of the chain-reversing upper and lower guides 31, 32.

Then, the non-illustrated cylinder actuator operates to lower the second holder portion 12b, thereby freeing the downwardly facing front surface of the flange portion S-1 of tile slider S to enable the tapes T of the fastener chain C to move through the guide channel defined in the slider S. Before the fastener chain C is threaded through the guide channel of the slider S, the coupling element rows E are guided in the element guide groove 11a-2 in the rear end supporting portion 11a-1 of the upper slider holder 11. The coupling element rows E, as they are moved through the stepped supporting surface 11a at the outlet of the element guide groove 11a-2, are smoothly and reliably threaded into the guide channel of the slider S. In this instance, the slider S is kept immovable partly because the downwardly facing front surface and the fore-end of the guide post S-2 are firmly retained on the contact surface 12a-1 of the first holder portion 12a, with the locking pawl S-4 held in the releasing position by the first holder portion 12a of the lower slider holder 12, and partly because the back of the flange portion S-1 is stably supported by the stepped supporting surface 11a of the upper slider holder 11.

As the fastener chain C is moved through the slider S while being kept immovable, the two rows of coupling elements E are disengaged by the slider S. The rows of coupling elements E are then introduced into the chain-reversing apparatus 3. The coupling element rows E, as they are moved through the apparatus 3, are reversed and the folded tape edges C-2 are completely unfolded, as shown in FIGS. 6(A)–6(E). More specifically, the two coupling element rows E are advanced through the element-reversing grooves 31b, 32b formed in the chain-reversing upper and lower guides 31, 32. During that time, at an inlet portion of each of the element-reversing grooves 31b, 32b, the leg-side end of each of the coupling elements E is guided and brought into contact with the arcuate inner peripheral wall 31b', as shown in FIG. 6(A). As the coupling element row E is advanced toward the outlet side of the element-reversing grooves 31b, 32b, it is raised gradually, then turned upwardly and inwardly, and subsequently tilted downwardly and inwardly, as shown in FIGS. 6(B), 6(C) and 6(D). As approaching the outlet side of the element-reversing grooves 31a, 32b, the folded longitudinal tape edge C-2 is completely reversed or turned inside out together with the coupling elements E supported thereon, as shown in FIG. 6(E).

FIG. 3 also illustrates an essential portion of the top stop applying apparatus 4. In the illustrated embodiment, top stops TS to be provided on the respective fastener tapes T are made from a thermoplastic synthetic resin, so that the top stop applying apparatus 4 is composed of a conventional ultrasonic welder. As will be described in brief with reference to FIG. 3, the ultrasonic welder 4 includes an ultrasonic horn 41 disposed above the left and right stringers C-1 and vertically reciprocally movable by the operation of a non-illustrated cylinder actuator to attach two blank strips TS' of thermoplastic synthetic resin to the corresponding stringers C-1 by fusing at a border between the coupling element row E and an element-free space portion. Designated by 42 is an anvil disposed below the ultrasonic horn 41 for supporting the left and right stringers C-1. The anvil 42 is vertically movable in synchronism with vertical movement of the ultrasonic horn 41. The top stop applying apparatus 4 should by no means be limited to the ultrasonic welder in the illustrated embodiment. For instance, if the top stops to be attached are made of metal, an ordinary top stop applying apparatus composed of a punch and a die should preferably be used.

Referring back to FIGS. 1 and 2, there is shown an example of the fastener product discharging means or apparatus 5 which is disposed downstream of the top stop applying apparatus 4 for achieving various tasks, such as feeding and positioning of the fastener chain C, spreading of the left and right stringers C-1, and discharging of the slide fastener products. As previously mentioned, the fastener product discharging apparatus 5 comprises the pair of first grippers 51 and the pair of second grippers 52. The both grippers 51, 52 are generally known in construction. However, they are designed to operate in a predetermined mode and at a timing peculiar to the present invention, in accordance with the instructions supplied from a control unit (not shown).

The first grippers 51 are disposed on opposite sides of the feed path of the fastener chain C and aligned with each other in a direction normal to the feed path. They are movable in the same manner with respect to the fastener chain C. More specifically, the first grippers 51 grip the fastener chain C from the transverse direction of the fastener chain C at an end which has been cut across the element-free space portion by the cutting apparatus 2. Then, they move on the opposite sides of the slider inserting apparatus 1 in the direction of movement of the fastener chain C. When tile first grippers 51 pass over the slider inserting apparatus 1, they start moving laterally in an outward direction to spread apart the left and right stringers while continuing to advance in the same direction as the direction of movement of the fastener chain C. They are stopped when predetermined portions of the respective stringers C-1 arrive at the corresponding top stop applying positions on the top stop applying apparatus 4. Then the first grippers 51 release the stringers C-1.

At this moment, the second grippers 52 start moving toward the cut ends (leading ends) of the left and right stringers C-1. Concurrently with the releasing operation of the first grippers 51, the second grippers 52 grip the cut ends of the stringers C-1 from the direction parallel to the movement of the fastener chain C. When top stop application completes at the top stop applying apparatus 4, the upper and lower slider holders 11, 12 of the slider inserting apparatus 1, the chain-reversing upper and lower guides 31, 32 of the chain reversing apparatus 3, and the ultrasonic horn 41 and the anvil 42 of the top stop applying apparatus 4 are moved in a direction away from each other. At the same time, a cylinder actuator 52a shown in FIGS. 1 and 2 is activated to extend its piston rod to laterally spread apart the second grippers 52, thereby removing the top stops TS attached to the stringers C-1 from the anvil 42. Then the second grippers 52 further move forwards to discharge a concealed slide fastener as a final product from the fastener finishing machine.

Subsequent to the discharge of the finished concealed slide fastener described above, a non-illustrated feed unit advances tile fastener chain C by a distance which is equal to the length of a concealed slide fastener to be produced in a next run of the fastener finishing machine. In the course of the chain supplying operation, the tapes of the fastener chain C are gripped by the first grippers 51 at the leading end (cut end) of the fastener chain C and fed forward by the first grippers 51. The foregoing sequence of operations may be repeated to automatically produce a desired number of concealed slide fasteners.

As is apparent from the foregoing description, according to the slider inserting apparatus, a slider having a unique structure due to its use with a concealed slide fastener can be held reliably and stably, so that a concealed slide fastener chain can be threaded smoothly through the slider. By use of a chain reversing apparatus which is structurally and operationally linked with the slider inserting apparatus, a top stop applying operation, which has heretofore required an additional processing step achieved by a different apparatus, can be achieved on a single fastener finishing machine substantially at the same time as the slider inserting operation. The fastener finishing machine when incorporated in a conventional concealed slide fastener manufacturing system will ensure a fully automated production of the concealed slide fasteners.

Obviously, various minor changes and modifications of the present invention are possible in the light of the above teaching. It is therefore to be understood that within the scope of the appended claims the invention may be practiced otherwise than as specifically described.

What is claimed is:

1. An apparatus for inserting a slider for a concealed slide fastener, comprising:

an upper slider holder having a contact surface contacting the back and the rear end of a flange portion of the slider, and a lower slider holder disposed directly below said upper slider holder and having a contact surface contacting, at least, the front surface and the fore-end of a guide post of the slider to support thereon the guide post, said lower slider holder being vertically movable when the slider is inserted into a fastener chain;

said lower slider holder including a first holder portion and a second holder portion respectively disposed forwardly and rearwardly of a pull chamber which is defined between said first and second holder portions for receiving therein a pull of the slider;

said first holder portion having a contact surface contacting the front surface and the fore-end of the guide post for supporting the guide post, and an unlocking surface contacting a locking pawl of the slider to release the locking pawl from interlocking engagement with coupling elements of the fastener chain when said contact surface of said first holder portion and the front surface and the fore-end of the guide post contact each other; and said second holder portion having a contact surface contacting the front surface of the flange portion for supporting the flange portion, said second holder portion being made movable in a direction away from the slider when the slider is held between said upper and lower slider holders.

2. An apparatus according to claim 1, wherein said first holder portion is pivotally movable about its lower end, and after said second holder portion engages the front surface of the flange portion of the slider, said first holder portion is pivotally moved upwardly to contact the front surface and the fore-end of the guide post and simultaneously unlock the locking pawl of the slider.

3. An apparatus according to claim 1, wherein said second holder portion is independently movable downwardly away from the slider while the slider is held between said upper and lower slider holders.

4. A fastener finishing machine for finishing a concealed slide fastener and including the slider inserting apparatus of claim 1, said fastener finishing machine comprising: a chain cutting device disposed on the upstream side of said slider inserting apparatus for cutting the fastener chain into predetermined product lengths; a chain reversing apparatus disposed adjacent to said slider inserting apparatus on the downstream side thereof and composed of a chain-reversing upper guide including a pair of laterally spaced element-reversing grooves and a chain-reversing lower guide having a pair of element-reversing grooves; a top stop applying apparatus disposed on the downstream side of said chain reversing apparatus; and fastener product discharge means for positioning a pair of fastener stringers of the fastener chain relative to said top stop applying apparatus and discharging a fastener product with top stops attached thereto to the downstream side of said fastener finishing machine.

5. A fastener finishing machine according to claim 4, wherein said fastener product discharge means includes a pair of first grippers for gripping the pair of fastener stringers, respectively, at a leading end of the fastener chain from a first direction normal to a path of feed of the fastener chain, and a pair of second grippers for gripping the fastener stringers, respectively, at the leading end of the fastener chain from a second direction parallel to the feed path of the fastener chain when said first grippers releases the leading end of the fastener chain, said first and second grippers being reciprocally movable in said first and second directions, respectively.

* * * * *